United States Patent
Gramaglia et al.

(10) Patent No.: US 10,094,150 B2
(45) Date of Patent: Oct. 9, 2018

(54) VEHICLE DOOR HANDLE AND METHOD TO ASSEMBLE SUCH DOOR HANDLE

(71) Applicant: VALEO S.p.A., Santena (IT)

(72) Inventors: Alberto Gramaglia, Pianezza (IT); Franco Brando, Pianezza (IT)

(73) Assignee: VALEO S.p.A., Santena (IT)

( * ) Notice: Subject to any disclaimer, the term of this patent is extended or adjusted under 35 U.S.C. 154(b) by 370 days.

(21) Appl. No.: 14/415,672

(22) PCT Filed: Jul. 18, 2013

(86) PCT No.: PCT/EP2013/065252
§ 371 (c)(1),
(2) Date: Jan. 19, 2015

(87) PCT Pub. No.: WO2014/013041
PCT Pub. Date: Jan. 23, 2014

(65) Prior Publication Data
US 2015/0204116 A1   Jul. 23, 2015

(30) Foreign Application Priority Data
Jul. 18, 2012   (EP) ..................... 12425125

(51) Int. Cl.
*E05B 85/10*   (2014.01)
*E05B 79/06*   (2014.01)
(Continued)

(52) U.S. Cl.
CPC .............. *E05B 85/10* (2013.01); *B23P 19/04* (2013.01); *E05B 79/06* (2013.01); *E05B 85/16* (2013.01);
(Continued)

(58) Field of Classification Search
CPC . Y10T 292/57; Y10T 70/5889; Y10T 292/85; Y10T 16/44; Y10T 16/458;
(Continued)

(56) References Cited

U.S. PATENT DOCUMENTS 2,117,192 A   5/1938  McClung
3,249,379 A   5/1966  Ross
(Continued)

FOREIGN PATENT DOCUMENTS

DE   1 137 652 B   10/1962
EP   1 201 851 A1   5/2002
FR   2 790 780 A1   9/2000

OTHER PUBLICATIONS

International Search Report for corresponding International Application No. PCT/EP2013/065252, dated Oct. 17, 2013 (4 pages).

*Primary Examiner* — Mark A Williams
(74) *Attorney, Agent, or Firm* — Osha Liang LLP

(57) ABSTRACT

A vehicle door handle includes a lever rotationally mobile between a rest position and a release position, a handle mechanism that allows opening of a vehicle door when actuated by the lever when the lever is in the release position, and an insertable body. The lever and the insertable body include a rolling surface and a pivot forming a hinge around which the lever is rotationally mobile, the lever includes one of the rolling surface and the pivot, and the insertable body includes the other of the rolling surface and the pivot.

5 Claims, 3 Drawing Sheets

Figure 1:
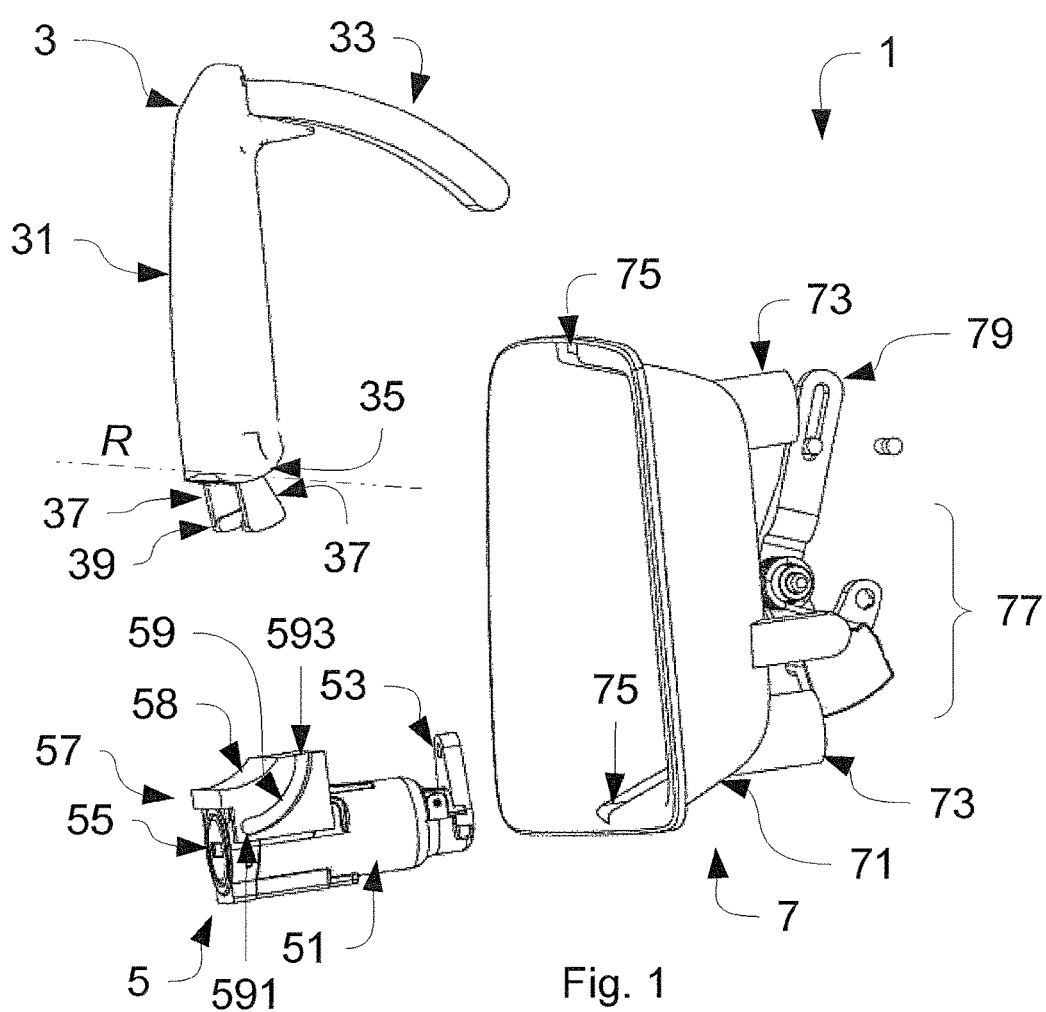

(51) Int. Cl.
*E05B 85/16* (2014.01)
*B23P 19/04* (2006.01)
*E05B 85/06* (2014.01)
*E05B 13/00* (2006.01)

(52) U.S. Cl.
CPC ............ *E05B 13/002* (2013.01); *E05B 85/06* (2013.01); *Y10T 29/4984* (2015.01); *Y10T 292/57* (2015.04)

(58) Field of Classification Search
CPC .... Y10T 70/7655; Y10S 292/23; E05B 85/16; E05B 85/06
USPC ...................................................... 292/336.3
See application file for complete search history.

(56) References Cited

U.S. PATENT DOCUMENTS

| | | | |
|---|---|---|---|
| 5,860,684 A * | 1/1999 | Mizuki | E05B 83/36 292/336.3 |
| 7,269,984 B2 * | 9/2007 | Jackson | E05B 13/004 292/216 |
| 8,146,393 B2 * | 4/2012 | Katagiri | E05B 17/18 292/336.3 |
| 9,856,675 B2 * | 1/2018 | Ilardo | E05B 7/00 |
| 2015/0322699 A1 * | 11/2015 | Ilardo | E05B 77/06 292/336.3 |

* cited by examiner

VEHICLE DOOR HANDLE AND METHOD TO ASSEMBLE SUCH DOOR HANDLE

CROSS-REFERENCE TO RELATED APPLICATIONS

This application is a National Stage application of International Patent Application No. PCT/EP2013/065252, filed on Jul. 18, 2013, which claims priority to European Patent Application No. 12425125.7, filed on Jul. 18, 2012. Both applications are hereby incorporated by reference in their entirety.

The invention relates to a vehicle door handle, used to open and close a vehicle door upon actuation by a user. The invention also relates to the associated method to assemble a vehicle door handle.

Vehicle door handles comprise a mobile part, usually a lever, that is actuated by the user, and a fixed part, usually a bracket, to attach the handle to the vehicle door. The mobile part is most commonly displaced between a rest position in which the door is maintained closed by a latch mechanism, and a release position, in which the mobile part causes the latch mechanism to release the door, so as to enable opening of said door.

To hinge the mobile part to the fixed one, the lever being a part of the mobile part comprises a swan neck with an end that cooperates with a pin placed in the bracket. The end of the swan neck comprises a ring or pincers which are attached to the pin. The said pin defines, with its longitudinal axis, the rotation axis around which the mobile part is rotationally moving.

However, the pins undergo important efforts, in particular torsion efforts, and have consequently to be built in a strong material for suffering such efforts and to be well attached to the bracket. The bracket itself has often to be adapted to resist and dissipate the torsion efforts.

The pins are often metallic rods that need proper insertion in the brackets so as to be resistant enough. This causes increased expenses when manufacturing and assembling the elements of the handle.

There is a need for a vehicle door handle which is able to overcome at least partially the aforementioned drawbacks and also to be assembled easier and faster.

In this perspective, the invention has for object a vehicle door handle, comprising:
  a lever, rotationally mobile between a rest position, and a release position,
  a handle mechanism, configured to release the opening of a vehicle door when actuated, the handle mechanism being actuated by the lever when said lever is in release position,
  an insertable body,
wherein the lever and the insertable body comprise a rolling surface and a pivot forming a hinge around which the lever is rotationally mobile, one of the two being comprised in the lever, and the other one in the insertable body.

According to the vehicle door handle, no pin is required for allowing the rotation of the lever on the bracket. The effort dispersion is improved when using the invention thanks to the pivot mechanism and the rolling surface. The invention enables a reliable, efficient and cheaper handle due to the absence of pin. The assembly time is also reduced.

The vehicle door handle may furthermore present one or more of the following features, taken separately or in combination.

It further comprises guiding means for the rotation of the lever on the surface of the insertable body.

Said guiding means may comprise at least one rib at the end of at least one protruding finger, cooperating with at least one corresponding groove in which the rib glides during rotational movement of the lever, the groove and the rib belonging to either the lever or the insertable body, respectively.

In a particular embodiment, the lever comprises the pivot or the rolling surface, and the insertable body comprises the rolling surface or the pivot, respectively.

The insertable body comprises a shoulder extending radially, on which are placed the pivot or rolling surface and the at least one rib or at least one groove.

The at least one rib and at least one groove engage each other when the lever and the insertable body are in a relative assembling position, in which the lever is rotated by a first angular value from the rest position of said lever and insertable body, and in that, in the release position, the lever is rotated by a second angular value from the rest position, the first angular value being greater than the second angular value.

The at least one groove merges in an edge of the element carrying it so as to form a groove outlet in which the at least one rib engages when the lever and the insertable body are in a relative assembling position in which the at least one rib and at least one groove engage each other.

The at least one groove comprises a groove end placed so that the ribs hit said groove end when the lever and the insertable body are in relative rest position.

The insertable body is a lock body or a dummy lock.

Another object of the invention is the associated method to assemble a vehicle door handle as previously described, wherein it comprises the steps in which:
  the lever and the insertable body are put in a relative assembling position, corresponding to a position in which the lever is rotated of a first angular value from the relative rest position, and in which the part of the guiding means on the lever are able to engage with the part of the guiding means on the insertable body,
  a part of the guiding means on the lever is engaged with a part of the guiding means on the insertable body,
  the lever and the insertable body are put in a relative rest position,
  the lever and the handle mechanism are linked so that rotating the lever causes an actuation of the handle mechanism.

The guiding means may further comprise at least one rib at the end of at least one protruding finger, destined to cooperate with at least one corresponding groove.

Said method may further comprise a step in which the lever and insertable body in relative assembling position are inserted in a bracket, and a step in which the bracket is mounted in the vehicle door.

As an alternative, it may further comprise a step in which the lever and insertable body in relative assembling position are mounted in the vehicle door.

Figure 2:
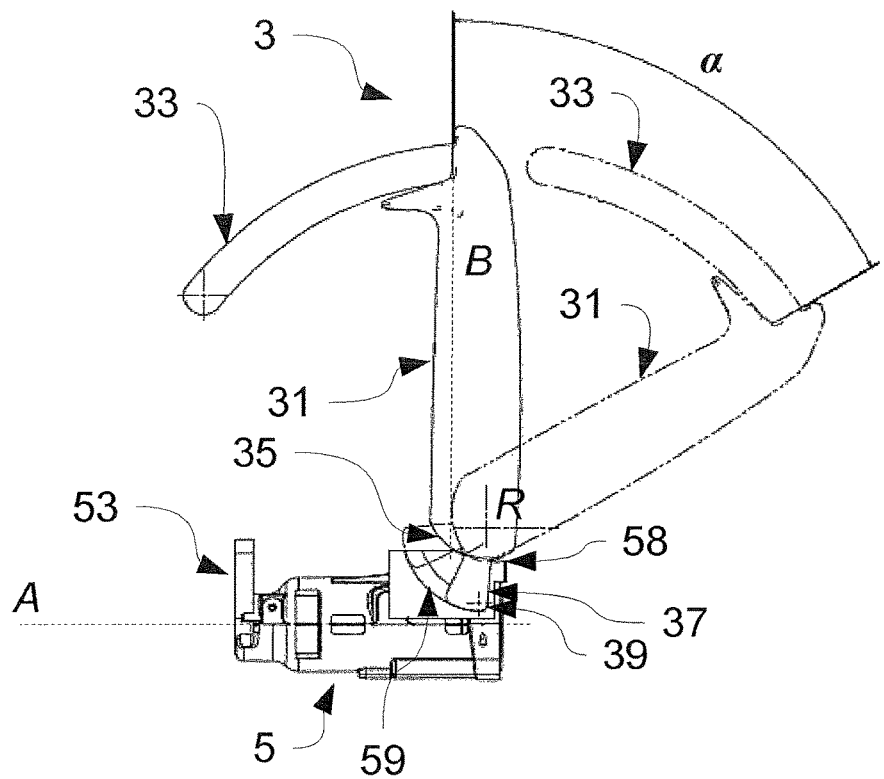
Figure 3:
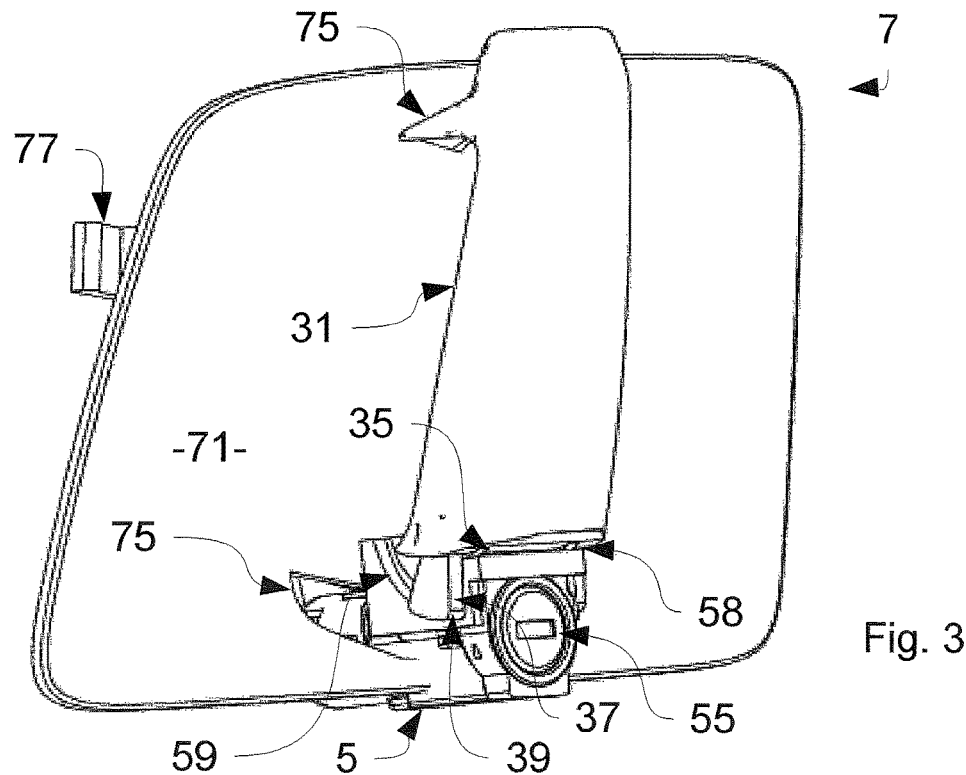
Figure 4:
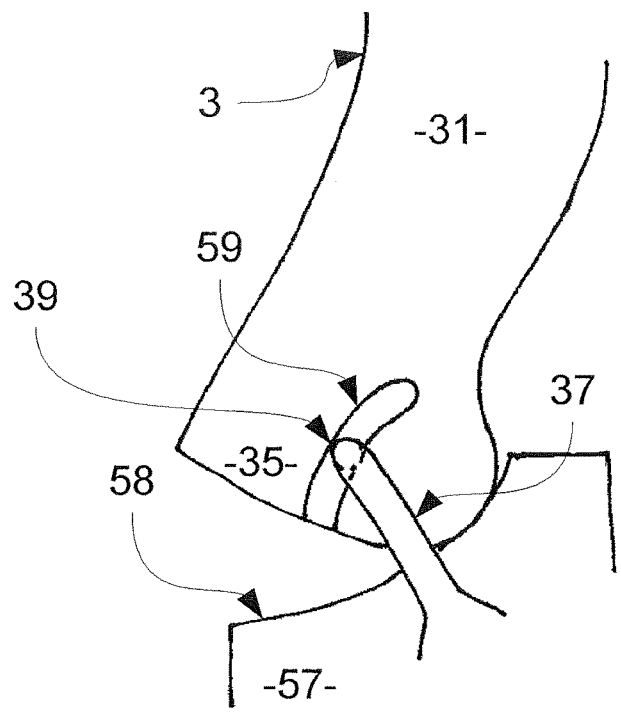
Figure 5:
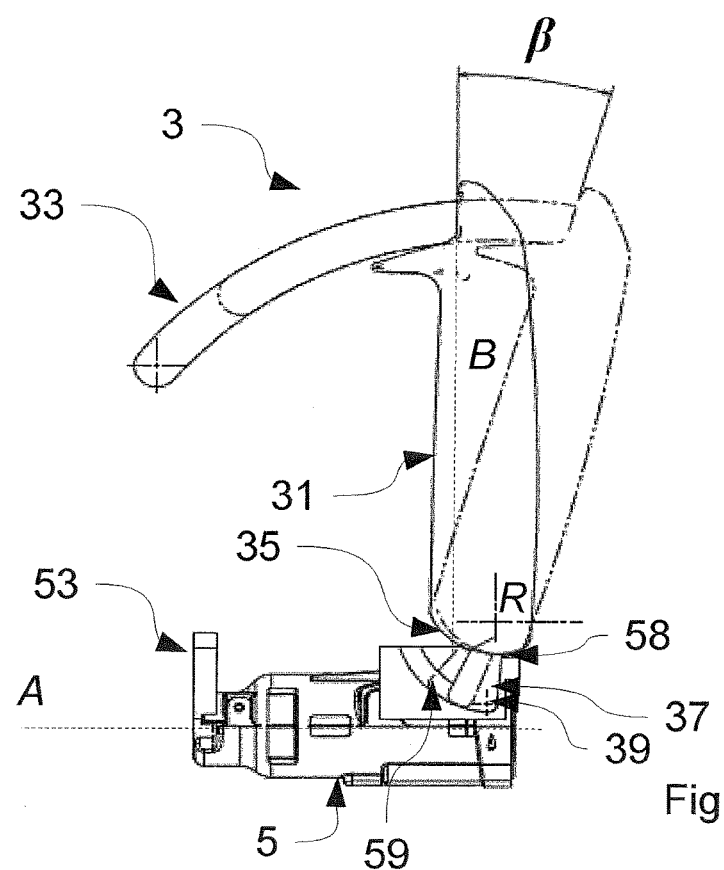

Other features and advantages will appear at the reading of the following description of the enclosed figures, among which:

FIG. 1 is an exploded view of the main component of a door handle according to one embodiment of the invention, FIG. 2 is a side view of elements of the vehicle door handle during assembly, FIG. 3 is an isometric view of the elements of FIG. 1 in assembled state, FIG. 4 is a schematic side view of handle elements in an alternative embodiment, FIG. 5 is a schematic view of the elements of FIG. 3 being used.

On all figures, the same references relate to the same elements.

FIG. 1 depicts the different elements of a vehicle door handle 1 according to one embodiment of the invention.

The handle 1 comprises a lever 3, an insertable body 5 and a bracket 7.

The lever 3 comprises a lever stem 31 of elongated form, a column 33, in form of a curved protrusion extending laterally from one end of the lever stem 31, and on the opposite end a pivot 35 and two roughly parallel protruding fingers or segments 37, on the extremities of which may be placed ribs 39 which point inwards. The pivot 35 is here a surface curved in the plane in which the lever 3 is destined to rotate when actuated, forming a condyle for a hinge. In particular, the pivot 35 can be of elliptic form, so as to roll without friction on a curved associated rolling surface, when a user sets the lever 3 in motion by grabbing the stem 31 and pulling.

The insertable body 5 is here a lock body. It comprises in particular an elongated lock mechanism 51, comprising the mechanical parts that allow the insertable body 5 to be selectively actuated by introducing and turning the appropriate key for example on base of a cylinder and cam mechanism. The mechanism 51 in particular comprises a rod 53, and a slit 55 on opposite far ends of the insertable body 5, the slit 55 receiving the key, and the rod 53 being rotated to free or prevent actuation of the handle 1 when the right key is inserted and turned.

The passenger doors of a car may have so called "dummy locks" which match the dimensions of the lock body, but are made of cheap material and without inner mechanism, destined to be inserted in the handle 1 instead of a true lock. In such case, the insertable body will of course be the dummy lock.

Another possibility is to take an additional rod as insertable body. However, by using the already present lock bodies or dummy locks, additional pieces are avoided, thus potentially reducing the price of the obtained handle 1.

The insertable body 5 may comprise a shoulder 57, bulk and extending slightly radially from the lock mechanism 51. On the face of said shoulder 57 opposed to the mechanism 51 is placed a rolling surface 58, the form of which corresponds to that of the pivot 35 and guiding the rolling movement of said pivot 35. The shoulder 57 may furthermore comprise on its lateral sides two grooves 59, one per side, for example milled in the shoulder 57 material.

In particular, said rolling surface 58 may be conformed so as to form a socket restraining the movement of the lever 3 between extremal positions of said lever 3.

The grooves 59 stretch along a circle arc path and have a square or rectangular section, matching the section of the ribs 39. The ribs 39 and grooves 59 form, when engaging each other, additional guiding means, in the discussed embodiment in form of a slider joint. The grooves 59 extend in a curve from an edge of the element that is carrying them, here the shoulder 57, to a groove end 591. By merging into the shoulder 57 edge, the grooves 59 form an outlet 593 through which the ribs 39 can be inserted in the groove 59.

The column 33 and grooves 59 form sensibly coaxial circle arcs centered, in assembled state of the handle, around a rotation axis R of the lever 3, wherein the rotation around axis R corresponds to the actuation movement of the lever 3 by the user to open the door. The radius of the circle arc of the column 33 corresponds roughly to the length of the lever stem 31. The radius of the circle arc of the grooves 59 corresponds to the distance from the rotation axis R to the ribs 39.

The two grooves 59 and the two ribs 39 are disposed one on each side of the rotation plane, the plane in which the lever rotates, so that said rotation plane forms approximately a symmetry plane of the two sliding joints obtained by cooperation of one groove 59 and rib 39.

The bracket 7 comprises a bracket body 71, here in form of a hollow bowl, destined to be mounted on the vehicle door, hollow side pointing outwards, and usually closing a hole in the surface of said door. To be rigidly bound to the door, the bracket body 71 comprises screw-holes 73, in which screws will be placed to attach to a chassis inside the door.

The bracket 7 also comprises two slits 75, on opposite sides of the body 71. In said slits 75 fit respectively the insertable body 5 and the column 33 of the lever 3 in assembled state.

On the side of the bracket 7 that points inwards of the vehicle door in assembled state, the bracket 7 comprises a latch mechanism 77, destined to be connected to the lever column 33 via an arm 79. The latch mechanism 77 is configured to prevent opening of the vehicle door in absence of actuation, and to release the opening of the vehicle door when actuated via the arm 79.

In particular, the latch mechanism 77 is configured to interact with the insertable body 5, more particularly with the rod 53, so that when the lock mechanism 51 is in locked state, actuation of said mechanism 51 is prevented. For example, the rod 53 may be placed on the path of a bolt of the latch mechanism 77, or block the movement of the lever 3 when the lock mechanism 51 is in locking state.

The hollow shape of the bracket 7 allows said bracket 7 to form a lodging in which the handle 1 is placed, thus reducing the drag of the vehicle.

FIG. 2 shows the lever 3 and the insertable body 5 during assembly. In particular, the lever 3 is represented in two different relative positions with respect to the insertable body 5, once in relative rest position (full lines) and once in relative assembling position (dashed lines).

The relative assembling position corresponds to the position in which the lever 3 and insertable body 5 are disposed relatively to each other to assemble the door handle 1.

In said position, the pivot 35 is leaning on the rolling surface 58, in a position where the part of the additional guiding means on the lever 3, here the ribs 39 engage in the part of the additional guiding means on the insertable body 5, here the grooves 59.

In the relative assembling position, the free end of column 33 to be inserted in the bracket 7 points in the insertion direction, which is perpendicular to the door surface and directed inwards of the vehicle. Also, in said relative position, the ribs 39 are engaging each in one of the outlets 593.

The column 33 of the lever 3 and the insertable body 5 are then inserted in the slits 75 of the bracket 7.

The lever 3 is thus afterwards rotated around rotation axis R of first angular value α, here about 60°, to reach relative rest position. During the rotation, the column 33 slides in the slit 75 of the bracket 7, and the ribs 39 slide in the grooves 59, thus acting as guiding elements. The grooves 59 may in particular be dimensioned so that in rest position the ribs 39 hit the groove end 591, thus limiting the lever 3 movement in this direction. The column 33 is then attached to the arm 79 of the latch mechanism 77, so that pulling the lever 3 actuates the mechanism 77, which links the lever 3 and the mechanism 77, so that moving the first causes actuation of the second.

In particular, the form of the grooves 59 is arranged so as to match the path the ribs 39 follow on the shoulder 57 when the lever 3 is rotated. This form may differ from that of a perfect circle arc in that the form of the pivot 35 may lead to a more complex movement than simple rotation around a fixed axis R, in particular if the pivot 35 has an elliptic form, or more generally a non constant curvature.

Following the aforementioned assembling steps, the bracket 7 carrying the lever 3 and insertable body 5 is then mounted on the vehicle door. Possible cover elements for aesthetic or protection purpose are then placed. Also, the insertable body 5 is attached to the door for solidity and thus security purpose.

In the relative rest position, the lever stem 31 is approximately at a right angle with a longitudinal axis A of the insertable body 5, which defines with the longitudinal axis B of the lever stem 31 a plane that also contains the column 33. This plane is, in the discussed embodiment, the rotation plane in which the lever rotates during actuation, the plane perpendicular to the rotation axis R.

This relative rest position corresponds to the position in which the lever 3 is in absence of actuation by the user. In particular, elastic means (not represented) can be implemented to cause the lever 3 to return automatically in the rest position. In said position, the latch mechanism 77 is not actuated and opening of the door is prevented.

FIG. 3 shows the lever 3, the insertable body 5 and the bracket 7, in assembled state.

In particular, the pre-assembled lever 3 and insertable body 5 as shown in FIG. 2 form a module that can be displaced between different assembling stations, thus allowing distribution of the work on more different stations. This is useful to avoid stacking at an overloaded work station.

Also, the pivot 35 and rolling surface 58 form a hinge with better effort dispersion characteristics than the usual pin and pincers hinge.

A particular, alternative embodiment can be obtained by directly implementing the lever 3 and insertable body 5 in slits of a non-represented outer panel of the door. In particular, the outer panel of the door can be locally brought in a shape similar to that of the bracket 7, for example by deep drawing of the hollow bowl shape, and milling of the slits.

Also, another parallel embodiment is obtained when inverting the position of the hinge elements on the lever 3 and insertable body 5, by placing the rolling surface 58 and grooves 59 on the lever 3, and placing the pivot 35, fingers 37 and ribs 39 on the insertable body 5 instead.

FIG. 4 pictures another alternative embodiment, in which the lever 3 comprises the pivot 35 and the grooves 59, and the insertable body 5 comprises the fingers 37 and the ribs 39 along with the rolling surface 58. In this embodiment the grooves are also in a circle arc shape, but they extend along the path the ribs 39 follow on the pivot 35 as the lever is rotated.

A fourth embodiment can be obtained by inverting the position of the hinge elements on the lever 3 and insertable body 5, by placing the rolling surface 58, fingers 37 and ribs 39 on the lever 3, and placing the pivot 35 and grooves 59 on the insertable body 5 instead.

FIG. 5 is a schematic representation of the lever 3 and insertable body 5, in pre-assembled state, once in relative rest position (full lines) and once in relative release position (dashed lines).

The relative release position corresponds to the position in which the lever column 33 actuates the latch mechanism 77 resulting in freeing the movement of the door.

As can be seen on FIG. 5, the relative release position is reached by rotating the lever 3 in the same direction as for reaching relative assembly position, but of a second angle value $\beta$, inferior to the first one $\alpha$. Said second value $\beta$ is here chosen around 15°.

In particular, the normal use implies limited rotation between the relative rest position and the relative release position, meaning rotations with an angle at most equal to the second angular value $\beta$. Since this second value $\beta$ is smaller than the first angular value $\alpha$ which corresponds to the position where the ribs 39 engage the grooves 59, it is ensured that during normal use the lever 3 and insertable body 5 never reach the relative assembly position in which the ribs 39 may disengage from the grooves 59.

Consequently, the unhinging the lever 3 from the handle 1 is impossible during normal use.

The vehicle door handle 1 according to the invention and the associated assembling method allow potential reduction of the overall price of said handle 1, while the door handle presents better torsion efforts dispersion characteristics.

The invention claimed is:

1. A vehicle door handle, comprising:
a lever rotationally mobile between a rest position and a release position;
a handle mechanism that allows opening of a vehicle door, wherein the handle mechanism is actuated by the lever to open the vehicle door when the lever is rotationally moved to the release position;
an insertable body comprising a lock body; and
a guide that guides rotation of the lever on a surface of the insertable body,
wherein the lever and the insertable body connect to form a hinge around which the lever is rotationally mobile, wherein the hinge is formed by the lever comprising one of a rolling surface or a pivot, and the insertable body comprising the other of the rolling surface or the pivot,
wherein said lock body comprises an elongated lock mechanism,
wherein the insertable body comprises a shoulder extending radially from the elongated lock mechanism, wherein the rolling surface is placed on a face of said shoulder opposite to the elongated lock mechanism, and wherein a form of the rolling surface corresponds to a form of the pivot and guides a rolling movement of said pivot, and
wherein the guide comprises at least one rib at an end of at least one protruding finger cooperating with at least one groove, wherein the at least one rib glides during rotational movement of the lever, and wherein the lever comprises one of the at least one groove and the at least one rib and the insertable body comprises the other of the at least one groove and the at least one rib.

2. The vehicle door handle according to claim 1, wherein the insertable body comprises a shoulder extending radially on which are placed the pivot or rolling surface and the at least one rib or the at least one groove.

3. The vehicle door handle according to claim 1, wherein the at least one rib and at least one groove engage each other when the lever and the insertable body are in a relative assembling position, in which the lever is rotated by a first angular value ($\alpha$) from the rest position of the lever and insertable body and in that, in the release position, the lever is rotated by a second angular value (β) from the rest position, the first angular value (α) being greater than the second angular value (β).

4. The vehicle door handle according to claim 1, wherein the at least one groove merges in an edge of a carrying element to form a groove outlet in which the at least one rib engages when the lever and the insertable body are in a relative assembling position in which the at least one rib and at least one groove engage each other.

5. The vehicle door handle according to claim 1, wherein the at least one groove comprises a groove end placed so that the at least one rib hit the groove end when the lever and the insertable body are in relative rest position.

\* \* \* \* \*